United States Patent
Fan et al.

(10) Patent No.: US 6,569,388 B1
(45) Date of Patent: May 27, 2003

(54) CARBONATION ASH REACTIVATION PROCESS AND SYSTEM FOR COMBINED $SO_x$ AND $NO_x$ REMOVAL

(75) Inventors: Liang-Shih Fan, Dublin, OH (US); Rajeev Agnihotri, Dublin, OH (US)

(73) Assignee: The Ohio State University Research Foundation, Columbus, OH (US)

( * ) Notice: Subject to any disclaimer, the term of this patent is extended or adjusted under 35 U.S.C. 154(b) by 0 days.

(21) Appl. No.: 09/363,912

(22) Filed: Jul. 28, 1999

(51) Int. Cl.$^7$ .................. B01D 53/50; B01D 53/56; B01J 8/00; B01J 20/00
(52) U.S. Cl. .................. 422/171; 422/168; 422/169; 422/170; 422/173; 422/177
(58) Field of Search .................. 423/210, 635, 423/636, 637, 640, 244.07, 244.08, 239.1; 422/168–177; 502/400

(56) References Cited

U.S. PATENT DOCUMENTS

| | | | |
|---|---|---|---|
| 4,554,542 A | * 11/1985 | Angevine et al. | 423/555 |
| 4,871,522 A | * 10/1989 | Doyle | 423/244 |
| 5,078,973 A | * 1/1992 | Kuroda et al. | 422/171 |
| 5,334,564 A | * 8/1994 | Pinnavaia et al. | 423/244.04 |
| 5,525,317 A | * 6/1996 | Bhat et al. | 423/239.1 |
| 5,779,464 A | * 7/1998 | Fan et al. | 423/244.08 |

OTHER PUBLICATIONS

Couturier, M. F., Marquis, D. L., Steward, F. R., and Volmerange, Y., "Reactivation of Partially–Sulphated Limestone Particles From a CFB Combustor by Hydration," *The Canadian Journal of Chemical Engineering*, 1994, 72, 91–97.

Davison, R. L., Natusch, D. F. S., Wallace, J. R., and Evans, C. A., "ce Elements in Fly Ash," *Environ. Sci. Technol.*, 8, 1107–1113, 1974.

Dismukes, E. B., "Trace Element Control in Electrostatic Precipitators and Fabric Filters," *Fuel Processing Technology*, 39, 403–416, 1994.

Germani, M. S., and Zoeller, W. H., "Vapor–Phase Concentrations of Arsenic, Selenium, Bromine, Iodine, and Mercury in the Stack of a Coal–Fired Power Plant," *Environ. Sci. Technol.*, 22(9), 1988.

Ghosh–Dastidar, A., Mahuli, S. Agnihotri, R., Fan, L.–S., "Investigation of High–Reactivity Calcium Carbonate Sorbent for Enhanced $SO_2$ Capture," *Ind. Eng. Chem. Res.*, 1996, 35(2), 598–606.

(List continued on next page.)

*Primary Examiner*—Hien Tran
(74) *Attorney, Agent, or Firm*—Standley & Gilcrest LLP

(57) ABSTRACT

The present invention includes methods and apparatus useful in the removal of air pollutants. More specifically, this invention relates to methods and apparatus useful in mitigating major air pollutants ($SO_x$ and $NO_x$) and trace toxins from coal-fired combustors. Using a method or apparatus of the present invention, a coal-fired combustor may be retrofitted to accommodate combined $SO_x/NO_x$ removal technology for solid waste reduction and environmentally responsible utilization of dry flue gas (FGD) desulfurization product. The combined $SO_x/NO_x$ control technology may integrate enhanced removal of $SO_2$ at high to medium temperatures using a desulfurization process of the present invention with selective catalytic reduction technology for $NO_x$. The reactivation of spent sorbent and dry FGD product may result in a more complete utilization of the ash and sorbent in the reduction of $SO_2$ emissions, thereby reducing significantly the amount of sorbent used and the volume of by-product generated. Modifications to a power plant may result in significant changes to the waste stream. Based upon the process for dry FGD product reactivation to achieve enhanced $SO_2$ removal and SCR for $NO_x$ removal, it may be possible to remove both sulfur and nitrogen oxides from high sulfur coal. The process is modular in nature (different components of the process can be by-passed as and when the need arises) and thus may have great flexibility and be applicable to various operating conditions.

9 Claims, 2 Drawing Sheets

OTHER PUBLICATIONS

Ghosh–Dastidar, A., Mahuli, S., Agnihotri, R., and Fan, L.–S., "Selenium Capture Using Sorbent Powders: Mechanism of Sorption by Hydrated Lime," *Environ. Sci. Technol.*, 30, 447–452, 1996.

Gullett B. K., and Raghunathan, K., "Reduction of Coal–Based Metal Emissions by Furnace Sorbent Injection," *Energy and Fuels*, 8, 1068–1076, 1994.

Gullett, B. K., Bruce, K. R., "Pore Distribution Changes of Calcium–Based Sorbents Reacting with Sulfur Dioxide," *AIChE J.*, 1987, 3 3, 1719.

Ho, T. C., Wang, K. S., and Hopper, J. R., "Metal Behavior and Metal Capture by Sorbents During Fluidized Bed Coal Combustion," 281–286.

Ho, T. C., R. Ramanarayan, J. R. Hopper, W. D. Bostick and D. P. Hoffmann, "Lead and Cadmium Capture by Various Sorbents During Fluidized Bed Combustion/Incineration," Fluidization VIII, International Symposium of the Engineering Foundation, May 14–19, Tours, France, 1995.

Josewicz, W., Chang, I C. S., Bma, T. G., Sedman, C. B., "Reactivation of Solids from Furnace Injection of Limestone for $SO_2$ Control," *Environ. Sci. Technol.*, 1987, 21, 664–670.

Josewicz, W., Rochelle, G. T., "Fly Ash Recycle in Dry Scrubbing," *Environmental Progress*, 1986, 5(4), 219–224.

Jozewicz, W., and B. K. Gullett, "Reaction Mechanisms of Dry Ca–Based Sorbents with Gaseous HC1," *Ind Eng. Chem. Res.* 34(2), 607–612, 1995.

Khan, T., Kulvarlainen, R., Lee, Y. Y., "Improving Limestone Utilization in Circulating Fluidized Bed Combustors Through the Reactivation and Recycle of Partially Utilized Limestone in the Ash," Fluidized Bed Combustion–vol. 2, ASME, 1995.

Mahuli, S., Agnihotri, R., Chauk, S., Ghosh–Dastidar, A., Wei, S.–H., Fan, L.–S., "Mechanism of Arsenic Sorption by Hydrated Lime," *Environ. Sci. Technol.*, 1997, 31(11), 3226–3231.

Mahuli, S., Agnihotri, R., Chauk, S., Ghosh–Dastidar, A., Wei, S.–H., Fan, L.–S., "Pore–Structure Optimization of Calcium Carbonate for Enhanced Sulfation," *AIChE J.*, 1997, 43(9), 2323–2335.

Markowski, G. R., and Filby, R., "Trace Element Concentration as a Function of Particle Size in Fly Ash from a Pulverized Coal Utility Boiler," *Env. Sci. Tech.*, 19(9), 1985, 796–804.

Marquis, D. L., "Reactivation of Spent CFB Limestone by Hydration," M. Sc. Thesis, University of New Brunswick, Fredericton, NB, 1992.

Martinez, J. C., Izquierdo, J. F., Cunill, F., Tejero, J., Querol, J., "Reactivation of Fly Ash and $Ca(OH)_2$ Mixtures for $SO_2$ Removal of Flue Gas," *Ind. Eng. Chem. Res.*, 1991, 30, 2143–2147.

Ondov, J. M., Ragaini, R. C., and Biermann, A. H., "Emissions and Particle–Size Distributions of Minor and Trace Elements at Two Western Coal–Fired Power Plants Equipped with Cold–Side Electrostatic Precipitators," *Env. Sci. Tech.*, 13(8), 946–953, 1979.

Shearer, J. A., Smith, G. W., Myles, K. M., Johnson, I., J, "Hydration Enhanced Sulfation of Limestone and Dolomite in the Fluidized–Bed Combustion of Coal," *Air Pollut., Control Assoc.*, 1980, 30, 684–688.

Thurnau, R. C., and Fournier D. Jr., J, "The Behavior of Arsenic in a Rotary Kiln Incinerator," *Air Waste Manage. Assoc.*, 42(2), 179–184, 1992.

Uberoi, M., and Shadman, F., "Sorbents for Removal of Lead Compounds from Hot Flue Gases," *AIChE J.*, 36(2), 1990.

Wei, S.–H., Mahuli, S. K., Agnihotri, R., Fan, L.–S., "High Surface Area Calcium Carbonate: Pore Structural Properties and Sulfation Charactertistics," *Ind Eng. Chem. Res.*, 1997, 36, 2141–2148.

Wouterlood, H. J., and Bowling, K. M., "Removal and Recovery of Arsenious Oxide from Flue Gases," *Environ. Sci. Technol.*, 13(1), 93–97, 1979.

Wu, B., Jaanu, K. K., and Shadman, F., "Multi–Functional Sorbents for the Removal of Sulfur and Metallic Contaminants from High Temperature Gases," *Environ. Sci. Technol.*, 1660–1665.

Agnihotri, R., Chauk, S., Mahuli, S., Fan, L.–S., "Sorbent Reactivation for Enhanced $SO_2$ Capture Using Novel Carbonation Technique," *Ind Eng. Chem. Res.*, 1999, 38.

Al–Shawabkeh, A, Matsuda, H., Hasatani, M., "Enhanced $SO_2$ Abatement with Water–Hydrated Dolomitic Particles," *AIChE, J.*, 1997, 43(1), 173–179.

* cited by examiner

CARBONATION ASH REACTIVATION PROCESS AND SYSTEM FOR COMBINED $SO_x$ AND $NO_x$ REMOVAL

TECHNICAL FIELD OF THE INVENTION

The present invention is in the field of pollution and contaminant removal.

BACKGROUND OF THE INVENTION

This invention relates to apparatus useful in the removal of air pollutants. More specifically, this invention relates to apparatus useful in mitigating major air pollutants (i.e., $SO_x$ and $NO_x$) and trace toxins from coal-fired combustors.

The residual solids resulting from various flue gas desulfurization (FGD) processes, including scrubber sludge, contain significant portions of unreacted sorbent. Unless these solids are treated, they will be sent to landfills, thus increasing the cost associated with sorbent requirements and waste disposal.

Nitrogen oxides ($NO_x$) are emitted when fossil fuels such as coal, natural gas, or oil are burned in air. $NO_x$ emissions have attracted increased attention in recent years as more is learned about their role in acid rain, smog, visibility impairment and global climate change. About half of all nationwide $NO_x$ pollutants come from automobiles, whereas coal-burning utility boilers contribute about 25% of the total. The 1990 Clean Air Act amendments require all coal-fired utility boilers over a certain size to reduce $NO_x$ by about 50%. In addition, it is expected that regulations affecting the emission of $NO_x$ will get tougher in the future and power plants will need to reduce emissions even further. Another serious problem may occur in integration, when trace metals and $NO_x$ may contaminate the catalyst.

In coal-fired power plants, disposal of coal combustion products such as ashes and wet/dry FGD products is a serious concern. Most of these solid wastes are sent to landfills for disposal. Studies have shown that, when treated properly, these solid waste products can be used beneficially in a number of applications.

It is therefore an object of the invention to provide a cost-effective method and apparatus for reducing the residual solids produced during the mitigation of major air pollutants and trace toxins from coal-fired combustors by recycling the unreacted sorbent contained in those solids.

Although described with respect to the field of mitigating major air and trace toxins from coal-fired combustors, it will be appreciated that similar advantages may obtain in other applications of the present invention. Such advantages may become apparent to one of ordinary skill in the art, in light of the present disclosure or through practice of the invention.

SUMMARY OF THE INVENTION

The present invention includes a reactivation technique developed from a fundamental understanding of the pore structural properties of both $CaCO_3$ and $Ca(OH)_2$, and the evolution of pore structure with calcination and sintering.

Integration of a $SO_x$ removal process of the present invention with SCR technology for $NO_x$ removal offers an attractive alternative to post-combustion flue gas clean-up technologies as it not only reduces the emission of acidic pollutants but also reduces the amount of solid-waste generated. The combined $SO_x/NO_x$ technology of the present invention integrates a novel ash reactivation process for $SO_x$ removal with proven SCR technology for $NO_x$ removal. The coal fired power plants that use high sulfur coals can be encouraged to continue using these coals by retrofitting to include the inventive process for advanced, cost effective $NO_x$ and $SO_2$ removal combined with reduced solid waste generation and increased dry FGD product utilization.

A recycling of spent sorbent and fly ash mixture into the spray dryer may result in substantial improvements in reagent utilization and $SO_2$ removal. Substantial reactions may occur between the fresh $Ca(OH)_2$ and recycled fly ash from spray dryer, resulting in the formation of hydrated calcium silicates. Their subsequent reaction with $SO_2$ may lead to increased efficiency.

Although not limited to the theory of the invention, the key to the high reactivity of a fresh or partially utilized sorbent may lie in its open initial internal structure and subsequent pore structure evolution under high temperature conditions. The present reactivation technique may be used for spent and under-utilized sorbents, and benefits from the pore structural properties of both $CaCO_3$ and $Ca(OH)_2$, and the evolution of pore structure with calcination and sintering. The present invention includes a suspension-based carbonation process in which the unreacted CaO is converted into calcium carbonate ($CaCO_3$) instead of calcium hydroxide ($Ca(OH)_2$).

Along with reactivation of unreacted CaO, this process provides a better distribution/exposure of available calcium than the reactivated spent sorbent from hydration alone. The process of the present invention has been successfully applied to the reactivation of two partially utilized sorbents generated in the laboratory, and has been further demonstrated to reactivate two commercial ash samples under bench-scale conditions.

Accordingly, the present invention includes devices and systems useful in removing air pollutants. This invention also includes machines or instruments using these aspects of the invention. The present invention may be used to upgrade or retrofit existing machines or instruments using methods and components known in the art.

The present invention also includes methods and processes using the devices of the present invention. The methods and processes of the present invention may be applied using procedures and protocols known and used in the arts to which they pertain.

In broadest terms, the present invention includes a method of removing $SO_x$ and trace metals from a gaseous waste stream from coal combustion, where the coal combustion generates an untreated gaseous waste stream containing $SO_x$ and trace metals, and the treatment of the gaseous waste stream generates a source of limestone, lime or slaked lime, comprising the steps: (a) admixing carbon dioxide with the source of limestone, lime or slaked lime and water so as to carbonate the limestone, lime or slaked lime, whereby a carbonated sorbent is produced; and (b) contacting the gaseous waste stream containing $SO_x$ and trace metals with the carbonated sorbent, so as to remove $SO_x$ and trace metals from the gaseous waste stream. The water may additionally contain at least one substance selected from the group consisting of surfactants and modifiers. The gaseous waste stream containing $SO_x$ and trace metals may be contacted with the carbonated sorbent in a circulating fluidized bed reactor. The gaseous waste stream may additionally contain $NO_x$ species, and may be contacted with a catalyst adapted to remove the $NO_x$ species following step (b). The flow of clean flue gas containing carbon dioxide may be obtained from contacting the gaseous waste stream with a catalyst adapted to remove $NO_x$ species following step (b).

The present invention also includes, in broadest terms, a system for removing $SO_x$ and trace metals from a gaseous waste stream from coal combustion, whereby the coal combustion generates an untreated gaseous waste stream containing $SO_x$ and trace metals, and the treatment of the gaseous waste stream generates a source of limestone, lime or slaked lime and a flow of clean flue gas containing carbon dioxide, comprising: (a) a coal-burning facility producing a source of an untreated gaseous waste stream containing $SO_x$ and trace metals, and an apparatus for removing $SO_x$ so as to generate a source of limestone, lime or slaked lime; (b) a carbonation reaction container for admixing the flow of said clean flue gas containing carbon dioxide with the source of limestone, lime or slaked lime with and water so as to carbonate said limestone, lime or slaked lime, thereby producing a carbonated sorbent; (c) a dryer adapted to remove water from the carbonated sorbent; and (d) a sorbent reaction container for contacting the gaseous waste stream containing $SO_x$ and trace metals with the carbonated sorbent, so as to remove $SO_x$ and trace metals from the gaseous waste stream.

The apparatus for removing $SO_x$ may be selected from the group consisting of wet, dry and wet-dry scrubbers. The system may additionally comprise a catalytic reaction container for contacting the gaseous waste stream with a catalyst adapted to remove $NO_x$ species following treatment in the sorbent reaction container. The catalytic reaction container may comprise a selective catalytic reduction catalyst. The system may additionally comprise a conduit adapted to conduct a flow of clean flue gas from the sorbent reaction container to the carbonation reaction container. The system may also comprise a conduit adapted to conduct a flow of clean flue gas from the catalytic reaction container to the carbonation reaction container.

The system may additionally comprise a conduit adapted to conduct the source of limestone, lime or slaked lime from the coal-burning facility to the carbonation reaction container. The system may also comprise a conduit adapted to conduct the untreated gaseous waste stream from the coal-burning facility to the sorbent reaction container. The system may contain a conduit adapted to conduct a flow of water to the carbonation reaction container. The system may include at least one particle separator, and may include a heat exchanger adapted to supply heat from the flow of clean flue gas to the dryer. The sorbent reaction container may also comprise a circulating fluidized bed reactor.

The present invention also includes, in broadest terms, a method of preparing a sorbent from limestone, lime or slaked lime generated from the removal of $SO_x$ from a gaseous waste stream from coal combustion, comprising the steps: obtaining said limestone, lime or slaked lime; and (b) admixing carbon dioxide and water with the limestone, lime or slaked lime so as to carbonate the limestone, lime or slaked lime, thereby producing a carbonated sorbent.

DETAILED DESCRIPTION OF THE PREFERRED EMBODIMENT (S)

In accordance with the foregoing summary, the following presents a detailed description of the preferred embodiment of the invention that is currently considered to be the best mode.

Figure 1:
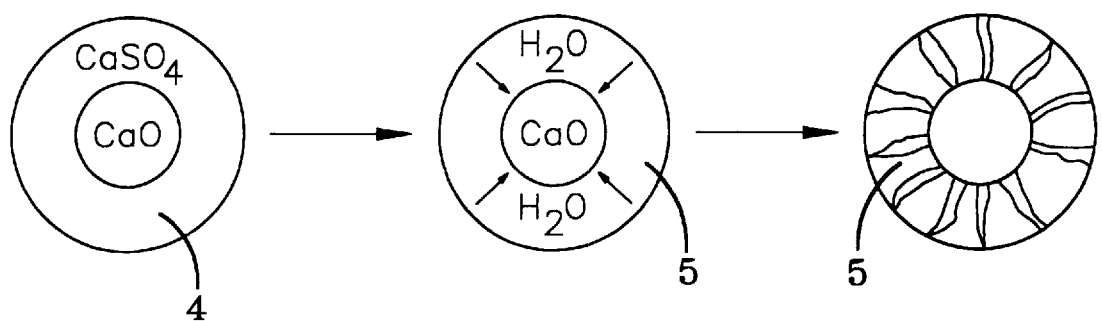
FIG. 1 shows the hydration reactivation of spent sorbent in accordance with one embodiment of the present invention.
Figure 2:
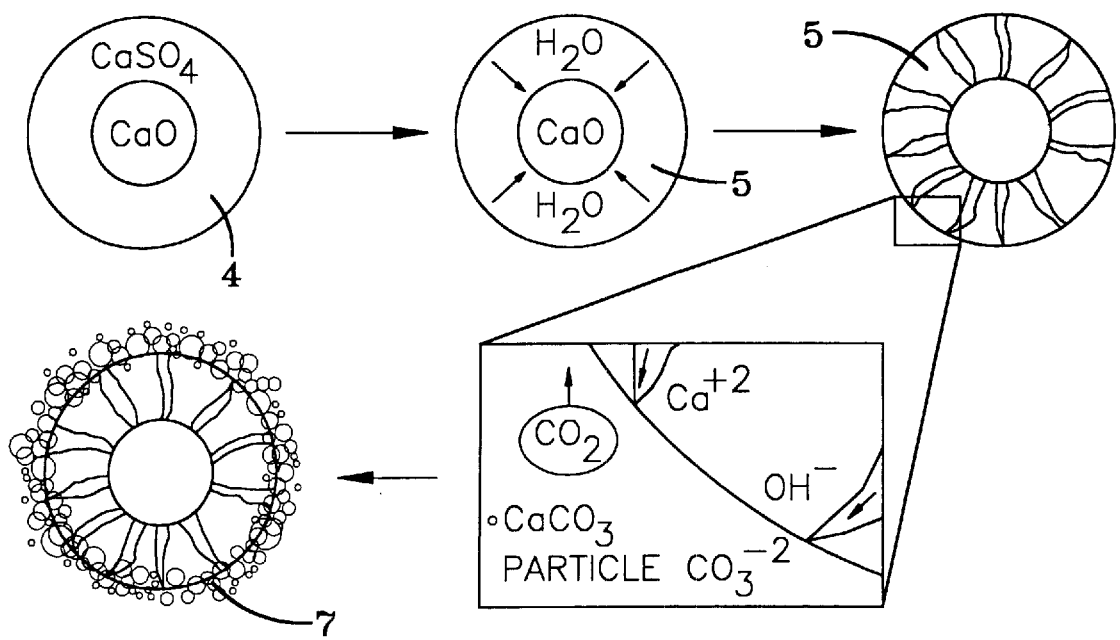
FIG. 2 shows the carbonation reactivation of spent sorbent in accordance with one embodiment of the present invention.

The method of the present invention may be used as a combined $SO_x/NO_x$ removal system, utilizing coal by-products. This method of the present invention for reactivating the partially utilized sorbent is based on a suspension-based carbonation process. The process involves converting the unreacted CaO into calcium carbonate ($CaCO_3$), as shown in FIG. 2, instead of calcium hydroxide ($Ca(OH)_2$), as shown in FIG. 1. FIG. 1 shows a partially sulfated CaO particle 4. Water may seep through the $CaSO_4$ layer 5 to react with the unsulfated CaO and form high molar volume $Ca(OH)_2$. The formation of high molar volume $Ca(OH)_2$ may lead to the development of cracks in the $CaSO_4$ layer 5. FIG. 2 shows the introduction of $CO_2$ to the $Ca(OH)_2$ particle, which may then react to produce the desired $CaCO_3$ 7. Combined with reactivation of unreacted $CaO_1$ this process may also provide a better distribution/exposure of available calcium than the reactivated spent sorbent from hydration alone.

Figure 3:
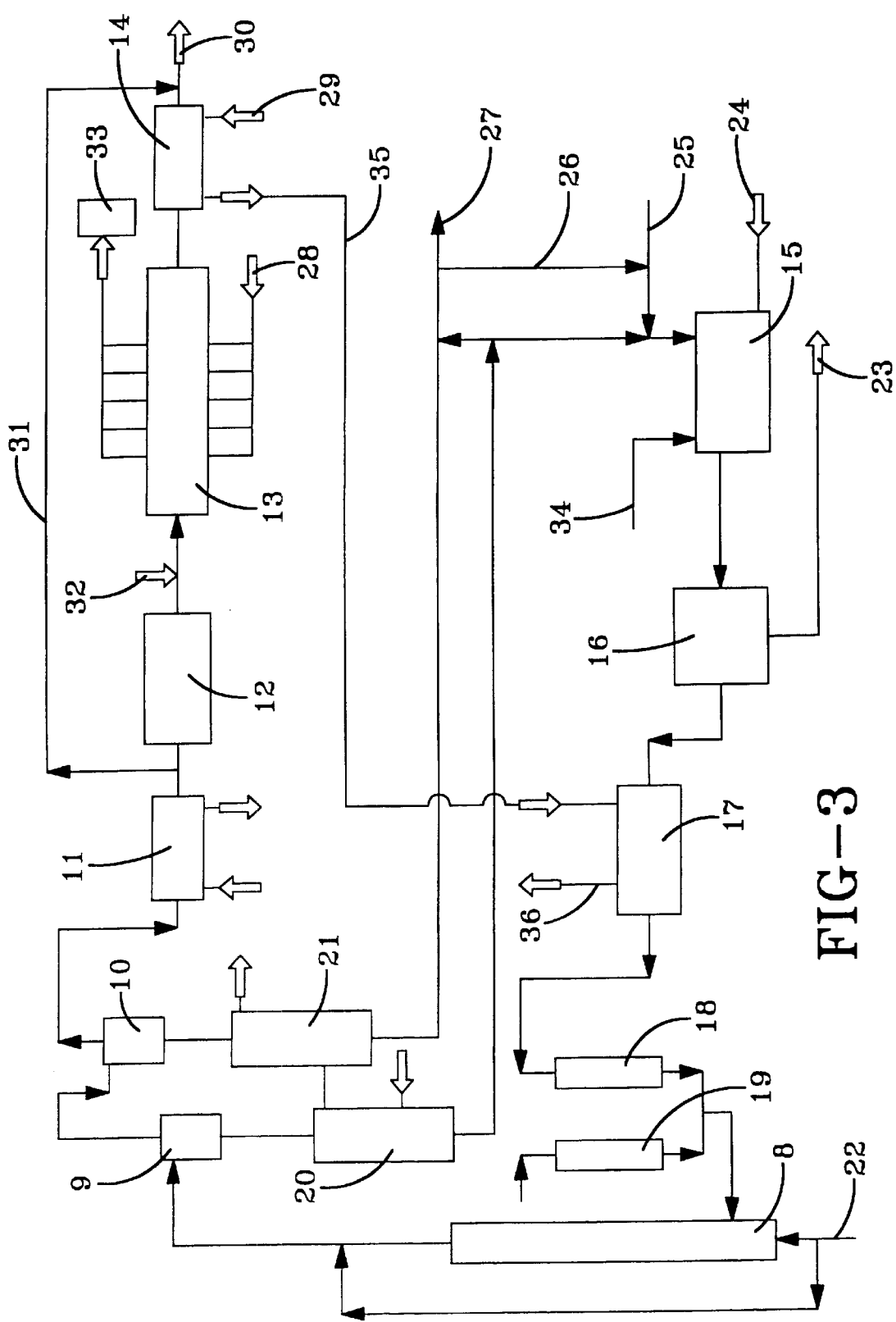
FIG. 3 is a schematic of a process of the present invention for combined $SO_x/NO_x$ removal in accordance with one embodiment of the present invention.

The process flow diagram with accompanying control devices is shown in a schematic given in FIG. 3. Part of the dry FGD product and ash 25 from the bag-house is sent to a slurry bubble column 15 (carbonator) for hydration and carbonation. A side stream 24 from the clean/scrubbed flue gas 30 may be used to provide $CO_2$ for carbonation of the ash. A water inlet 34 is provided. Following carbonation, the slurry is sent to a continuous filtration unit 16 to reduce the water content to 35%. Remaining water in the reactivated ash is removed in a continuous powder dryer 17. Water from the continuous filtration unit may be cycled through the system or neutralized by addition of dilute alkaline solutions. The effluent water may also be reused as a wetting agent for the wet-dry scrubber or discharged to the sanitary sewer 23.

Reactivated ash with less than 2% moisture content may then be stored for later use in the reactivated ash storage container 18. This reactivated ash, possibly along with limestone from the contingent limestone storage container 19, is introduced into the fluidized-bed riser reactor 8 as makeup sorbent along with flue gas from the flue gas inlet 22 and recycled solids from the primary particle separator 9 and the secondary particle separator 10, which pass the ash to the primary ash storage hopper 20 and secondary ash storage hopper 21 respectively. Ash from the storage hoppers may be used in the ash recycle 26 or passed to the ash disposal 27. Hot gases with reduced $SO_x$ levels leaving the fluidized-bed riser reactor 8 are heat-exchanged with wet reactivated ash in a powder dryer unit 11 and pass through another particle separator 12 prior to entering into the SCR reactor 13. Ammonia is introduced via line 32 upstream of the SCR reactor to ensure effective mixing. An SCR bypass 31 is also provided. The SCR reactor is designed as a staged fixed-bed reactor with provision for aggressive soot blowing, with 28 as the inlet and 33 as the outlet. Staging of the catalyst bed is considered necessary to reduce the overall pressure drop and to facilitate effective soot blowing. Gases coming out of the SCR reactor pass through the air heater 14, and through the clean flue gas outlet 30 and are redirected into the main breaching of the power plant and carried into the low-temperature wet-dry scrubber. An air inlet 29 is provided for the air heater, and the hot air passing from the air heater 14 is passed on to the powder dryer 17 via heated-air line 35. The powder dryer 17 transfers the thermal energy of the heated air stream transported in heated-air line 35 to the reactivated ash so as to reduce the moisture content of the reactivated ash via heat exchanger. Exhaust line 36 discharges the air from the powder dryer 17 after the thermal energy of the heated air stream has been transferred. The overall design of the process is modular with inherent flexibility to suit any operating conditions at operator's discretion.

Discussion of Results

Selective Catalytic Reduction (SCR) technology involves the catalytic reaction of ammonia that is injected into the flue gas containing $NO_x$ to produce nitrogen. Specifically, hot flue gases leaving the economizer section of the combustor may be directed into a catalytic reactor. Prior to entering the reactor, ammonia may be injected into the gas stream. Currently, most of the commercial formulations of SCR catalyst comprise vanadia ($V_2O_5$) as the active material deposited on or incorporated with a substrate ($TiO_2$). The quantity of ammonia injection may be regulated to provide optimum operation of the reactor at a temperature of 375° C. with minimum ammonia slippage (less than 5 ppm).

Ca-based sorbents, particularly quicklime (CaO), limestone (CaCO3) and hydrated lime ($Ca(OH)_2$), are used extensively in FGD processes in coal-fired combustors. Currently they all suffer from low reactivity and sorbent under-utilization. Typically, because of pore blocking and pore mouth plugging, less than 70% of the available calcium is converted to high molar volume calcium sulfate product. As a consequence, the spent sorbent from a typical FGD process contains significant amounts of unused sorbent which, unless treated, is disposed of as a solid waste. This in turn may lead to increased costs associated with sorbent disposal and need for fresh sorbent. The spent sorbent exhibits negligible reactivity towards $SO_2$ unless reactivated to expose the unreacted CaO. Reactivation of the under-utilized sorbent may necessarily require re-exposing and/or redistribution of the CaO from the interior of the sorbent particle and reactivation of the sintered CaO by converting it into a more reactive form. The fundamental challenge and goal of the reactivation process may be to redistribute the $CaSO_4$ that is located predominantly on the surface of the particle to a more uniform distribution.

One of the methods for reactivating partially utilized sorbents is hydration. In this process, the unsulfated CaO is reacted with water to form $Ca(OH)_2$. Due to the higher molar volume of the hydroxide (33 cc/gmol), compared to CaO (17 cc/gmol), the sorbent particle may expand and the non-porous $CaSO_4$ shell crack, thereby exposing the hydrate. Reactivation of spent lime/limestone samples from circulating fluidized bed combustor via hydration may cause particle expansion with an increase in internal volume. Moreover, once this reactivated sorbent is reintroduced into the combustor, calcination of the $Ca(OH)_2$ may further increase the porosity and provide added exposure of CaO to $SO_2$. Hydration has been known to increase the utilization of spent sorbent from 35% up to 70%. The above mentioned mechanisms for reactivation of spent sorbent via hydration suggest that big particles may undergo reactivation by particle expansion and subsequently develop cracks on the outer is inactive sulfate shell. Reactivation of particles that are of smaller dimension might be due to reactions between silica/alumina species and calcium leading to the formation of Ca—Si—Al hydrated complexes. These complexes have high surface areas and may be highly effective for gas-solid reactions.

Reduction of $NO_x$ emissions may be carried out by various means. Modifications or retrofitting during combustion may reduce $NO_x$ generation and subsequent emissions by as much as 40%. Combustion modifications may be limited to simply installing an oxygen meter and reducing the use of excess air; or they may incorporate a more capital-intensive initiative by installing low $NO_x$ burners that may require extensive modification to the furnace and may not be economically suitable for small or older units.

Post-Combustion controls may mean using ammonia with or without a catalyst to remove the $NO_x$ in the flue gases. Reduction without the catalyst may be carried out at higher temperatures and may suffer from some serious drawbacks. Reduction in the presence of catalyst or selective catalytic reduction is fast becoming a method of choice for reducing post-combustion $NO_x$. This process technology may be applied to a wide range of coal, oil, and gas fired boilers with demonstrated success in achieving greater than 90% $NO_x$ reduction.

Slip of ammonia is a concern in the application of SCR to a coal-fired combustor as it leads to the formation of ammonium bisulfate ($NH_4HSO_4$) which may cause severe corrosion problems as it condenses on the downstream equipment. The formation of $NH_4HSO_4$ may be directly related to the sulfur content of the coal used. Combustion of high-sulfur coal may lead to formation of higher flue gas $SO_2$ content, which might cause more $SO_2$ to be converted to $SO_3$ in the SCR reactor thereby aggravating the $NH_4HSO_4$ problems. For effective application of SCR technology, it may be important for the $SO_2$ content of the flue gas to be substantially lowered upstream of the SCR reactor.

Utility coal-fired boilers that have low-temperature FGD (wet or wet-dry scrubbers) processes for reduction of $SO_2$ emission but are non-compliant for $NO_x$ emission face a daunting task in controlling the $NO_x$ emission while continuing the use of high-sulfur coal. A possible strategy for control of $NO_x$ emissions for such units is integration of post-combustion $SO_2$ control and SCR technology. The inventive process provides a sorbent that may be used for reduction in $SO_2$ levels upstream of SCR reactor.

One of the environmentally responsible, yet profitable alternatives for dry FGD product usage is in construction industry. Strength, permeability, and stiffness determinations were made for several FGD materials. The values obtained were compared with the engineering properties of conventional construction materials.

The effectiveness of the inventive ash reactivation process and a comparison of the process with hydration reactivation process was established after conducting extensive studies in a bench-scale set-up with two in-house generated spent sorbents and two ash samples from a commercial coal combustor.

SCR is already in use overseas at power plants that burn natural gas, oil, and low-sulfur coals; however, the technology has never been fully demonstrated on high-sulfur coals in the U.S. utility market. The Gulf Power Company Plant Crist in Pensacola, Fla. was the site of a Clean Coal Technology project sponsored by DOE to demonstrate the use of SCR technology for $NO_x$ reduction. The project demonstrated the use of SCR technology at high and low dust loading of the flue gas to provide a cost-effective means of reducing $NO_x$ emissions from the power plant burning high sulfur coal. In this demonstration project, the SCR facility consisted of three 2.5 MWe equivalent SCR reactors supplied by separate 5,000 scfm flue gas slipstreams and six smaller 0.2 MWe-equivalent SCR reactors. These reactors were calculated to be large enough to provide design data that would allow the SCR reactors to be scaled-up to the commercial size. Removal of over 80% $NO_x$ at ammonia slip well under 5 ppm was demonstrated.

In the present combustion configuration for coal-fired boilers, selective catalytic reduction (SCR) of $NO_x$ may be the most promising technology for achieving the drastic reduction in $NO_x$ levels mandated by EPA regulations. If the coal used in the facility has high sulfur content, however, it may be imperative that $SO_x$ removal from flue gas be undertaken, possibly at higher temperature prior to removing the $NO_x$ by SCR. The present invention, with demonstrated bench-scale success in removing $SO_x$, may be integrated with the SCR technology to effectively reduce the $SO_x$ and $NO_x$ emissions while reducing the FGD.

The SCR technology offers the following benefits: it may be one of the few $NO_x$ technologies capable of removing high levels of 80% or more; it may be applicable to all types of boilers, including cyclone-fired boilers which cannot be easily retrofitted with other types of $NO_x$ control technologies; and it may be used with both new and existing power plants. The demonstration of SCR technology may be designed to address several uncertainties, including potential catalyst deactivation due to poisoning by trace metal species, performance of the technology in the presence of high amounts of $SO_x$, and performance of the SCR catalyst under typical high sulfur coal operating conditions.

The presence of arsenic and other trace element species may be detrimental to the performance of SCR catalyst and is known to cause catalyst deactivation and reduced life. Calcium-based sorbents have shown good results for capture of trace metallic species. Calcium oxide may react with both selenium and arsenic to form calcium selenite and arsenate respectively, and thus can be effectively used as a:sorbent for these two trace species at medium temperatures (400–600° C.). Experimental results by other researchers have shown calcium-based sorbents to be ineffective in lead, cadmium, arsenic, and selenium removal from flue gas stream at temperatures in the range of 500–800° C.

The operation of the inventive desulfurization process upstream of the SCR reactor may not only lower the $SO_2$ levels in the flue gas stream, but preserve the SCR catalyst by effectively reducing the trace metal loading of the flue gas.

Although most of the inorganic mater in coal remains in the ash, coal combustion does lead to volatilization of some of the low-boiling trace elements and their subsequent transfer into the gas-phase. Some high volatility trace elements are exclusively emitted as vapor through the stack. Some of the less volatile trace elements partly deposit on the ash particles or condense as aerosol particles as the flue gas cools down and are partly emitted into the atmosphere as vapor and particulates. These elements are known as chalcophiles. As, Se, Pb, Sb, and Cd are some examples of elements that display such behavior.

Most of the chalcophilie elements have been identified as air toxics from coal-fired combustor and utility boilers in the 1990 Clean Air Act Amendments (CAAA), and are also considered potential SCR catalyst poisons. The U.S. EPA has been conducting extensive research to determine their health and environmental effects. The control of chalcophilic emissions presents a formidable technical and economical challenge to the operation of coal-fired boilers. This is due in part to the lack of understanding of the behavior of these elements and also due to the fact that they exist in only trace amounts. Considerable effort has been made in last 4–5 years to determine the speciation of these elements. Most of the research has concentrated on determining the exact chemical form(s) of these elements in a highly varied and heterogeneous flue gas environment, with very limited attention being focused on the actual methodology to be applied to their control. Application of sorbents, especially calcium-based sorbents, has shown considerable promise in irreversibly capturing some of these trace species.

Methods and Materials

The following process equipment description represents the primary component systems of the inventive $SO_x/NO_x$ process. There may be considerable system integration with the scrubber unit or existing site equipment that could also be utilized.

Riser Reactor for $SO_x$ Control: At high $SO_2$ levels the catalyst in the SCR reactor may oxidize $SO_2$ to $SO_3$ which would react with ammonia to give ammonium bisulfate. Therefore, it may be important to remove or lower the levels of $SO_2$ prior to end the gas to the SCR unit. The $SO_x$ reactor may be a fluidized-bed riser reactor. The hot flue gas stream generated during coal combustion may be introduced from the bottom of the riser part of the reactor to reduce the $SO_2$ levels by reacting with reactivated ash sorbent upstream of the SCR reactor. The fluidized-bed riser reactor may be designed to provide average solid hold-up of 10%, superficial gas velocities sufficient for fluidization (3–4 m/s), and optimum mixing and retention times. Sample ports may be added at the key locations to test for $NO_x$, $SO_x$, and toxin, concentration. Inlet and outlet compositions of the gas stream may be monitored continuously for purposes of documenting the performance of the reactor and the reactivated sorbent.

SCR Reactor: Ammonia may be injected into the gas stream at a sufficient distance upstream of the SCR reactor to allow optimum time for complete mixing. The $NO_x$ reactor may be a staged fixed-bed reactor, with plates of catalyst spaced preferably at equal distances of 0.5 inches. The flue gas stream may enter the reactor at a temperature of 375° C. The reactor may be equipped with soot-blowing accessories in the form of lances placed between the catalyst plates. Currently, most commercial formulations of the SCR catalyst use vanadia ($V_2O_5$) as the active material deposited on or incorporated with a substrate ($TiO_2$). The quantity of ammonia injection may be regulated to provide optimum operation of the reactor at a temperature of 375° C. with minimum ammonia slippage (less than 5 ppm). The presence of $SO_x$ riser reactor with calcium based sorbent upstream of the SCR reactor may enhance the performance of the catalyst by removing the presence of trace heavy metals which are considered to be poisonous to the catalyst.

Slurry Bubble Column (Carbonator): Reactivation of the dry scrubber products and ash may be carried out in a slurry bubble column at ambient temperatures. A side stream of clean flue gas may be used to provide $CO_2$ for carbonation and agitation. The slurry bubble reactor may be designed to operate with a solids concentration of 10%. The carbonation reactivation of the partially used sorbent and ash may result in the re-exposure and redistribution of the unreacted/unutilized calcium sorbents for further reaction with $SO_2$. Continuous monitoring of the slurry pH and temperature may then be carried out to determine the efficiency of the carbonation reactivation process.

Continuous Filtration and Powder Drying: Following the carbonation reactivation, the slurry may be decanted for filtration prior to sending the filter cake for drying. The drying of the filer cake may be accomplished by contact with the hot gases leaving the fluidized bed reactor. The design of the continuous powder drying may be such that the gas stream leaving the dryer for the SCR reactor is maintained at 400° C. The water from the clarifier may be reused in the carbonator or may be neutralized prior to discharge.

Control and Analytical Instrumentation: Flue gases from the overall process may be closely monitored using a Continuous Emissions Monitor (CEM). Gas composition may be determined on a continual basis upstream of the $SO_x$ reactor and downstream of the SCR reactor. An online ammonia analyzer may be placed downstream of the SCR reactor to closely monitor ammonia slippage and to determine catalyst activity. The ammonia delivery system may be equipped with fail-safe control system to terminate the injection of ammonia into the gas stream if the injected flow rate increases past a pre-determined value. The design of the system may provide for gas sampling and temperature monitoring at various key locations.

The preferred embodiments herein disclosed are not intended to be exhaustive or to unnecessarily limit the scope of the invention. The preferred embodiments were chosen and described in order to explain the principles of the present invention so that others skilled in the art may practice the invention. Having shown and described preferred embodiments of the present invention, it will be within the ability of one of ordinary skill in the art to make alterations or modifications to the present invention, such as through the substitution of equivalent materials or structural arrangements, or through the use of equivalent process steps, so as to be able to practice the present invention without departing from its spirit as reflected in the appended claims, the text and teaching of which are hereby incorporated by reference herein. It is the intention, therefore, to limit the invention only as indicated by the scope of the claims and equivalents thereof.

REFERENCES

1. Agnihotri, R., Chauk, S., Mahuli, S., Fan, L.-S., "Sorbent Reactivation for Enhanced $SO_2$ Capture Using Novel Carbonation Technique," *Ind Eng. Chem. Res.*, 1999, 38.
2. Al-Shawabkeh, A, Matsuda, H., Hasatani, M., *AIChE, J.*, 1997, 43(1), 173–179.
3. Bobman, M. H., Weber, G. F., Keener, T. C., "Additive Enhancement of Pressure-Hydrated Lime for Control Of $SO_2/NO_x$, Emissions", presented at the Spring National Meeting of AIChE, Houston, Tex., 1985.
4. Bortz, S., and Flament, P., *Proceedings. First Joint Symp. on Dry $SO_2$ and Simultaneous $SO_2/NO_x$ Control Technologies*, Vol. 1, EPA-600/9-85/020a, (NTIS PB85-232353), 1985.
5. Couturier, M. F., Marquis, D. L., Steward, F. R., and Volmerange, Y., *The Canadian Journal of Chemical Engineering*, 1994, 72, 91–97.
6. Davison, R. L., Natusch, D. F. S., Wallace, J. R., and Evans, C. A., *Environ. Sci. Technol.*, 8, 1107–1113, 1974.
7. Dismukes, E. B., *Fuel Processing Technology*, 39, 403–416, 1994.
8. Germani, M. S., and Zoeller, W. H., *Environ. Sci. Technol.*, 22(9), 1988.
9. Ghosh-Dastidar, A., Mahuli, S. Agnihotri,R., Fan, L.-S., *Ind. Eng. Chem. Res.*, 1996, 35(2),598.
10. Ghosh-Dastidar, A., Mahuli, S., Agnihotri, R., and Fan, L.-S., *Environ. Sci. Technol.*, 30, 447–452, 1996.
11. Gregg, S. J., and Sing, K. S. W., "Adsorption, Surface Area and Porosity," Academic Press, 1982.
12. Gullett B. K., and Raghunathan, K., *Energy and Fuels*, 8, 1068–1076, 1994.
13. Gullett, B. K., Bruce K. R., *AIChE. J.*, 1987, 33, 1719.
14. Gullett, B. K., Jozewicz, W., and Stefanski, L. A., *Ind. Eng. Chem. Res.*, 31(11), 1992.
15. Ho, T. C., Lee, H. T., Chu, H. W., and Hopper, I R., Proceedings of EERC Workshop on Trace Elements Transformations in Coal-fired Power Systems Workshop, Scottsdale, Ariz., Apr. 19–21, 1993.
16. Ho, T. C., R. Ramanarayan, I R. Hopper, W. D. Bostick and D. P. Hoffmann, Fluidization VIII, International Symposium of the Engineering Foundation, May 14–19, Tours, France, 1995.
17. Hurst, T. B., Bielawski, G. T., "Dry Scrubber Demonstration Plant," in Proceedings: Symposium on Flue Gas Desulfurization, Volume 2, EPA-600/9-81-019b (NTIS PB81-243164), 1981.
18. Josewicz, W., Chang, I C. S., Bma, T. G., Sedman, C. B., *Environ. Sci. Technol.*, 1987, 21, 664–670.
19. Josewicz, W., Rochelle, G. T., *Environmental Progress*, 1986, 5(4), 219–224.
20. Jozewicz, W., and B. K. Gullett, *Ind Eng. Chem. Res.* 34(2), 607–612, 1995.
21. Khan, T., Kulvarlainen, R., Lee, Y. Y., Fluidized Bed Combustion-Volume 2, ASME, 1995.
22. Mahuli, S., Agnihotri, R., Chauk, S., Ghosh-Dastidar, A., Wei, S.-H., Fan, L.-S., *AIChE J*, 1997, 43(9), 2323–2335.
23. Markowski, G. R., and Filby, R., *Env. Sci. Tech.*, 19(9), 1985.
24. Marquis, D. L., "Reactivation of Spent CFB Limestone by Hydration," M. Sc. Thesis, University of New Brunswick, Fredericton, NB, 1992.
25. Martinez, J. C., lzquierdo, J. F., Cunill, F., Tejero, J., Querol, J., *Ind. Eng. Chem. Res.*, 1991, 30, 2143–2147.
26. Melia, M. T. McKibben, R. S., Pelsor, B. W., "Utility Flue Gas Desulfurization Survey July 1982–March 1983," Project Summary, EPRI Contract No. RP982-32, EPRI, 1983.
27. Natusch D. F. S., Wallace J. R. and Evans C. A., *Science*, 183, 202, 1974.
28. Ondov, J. M., Ragaini, R. C., and Biermann, A. H., *Env. Sci. Tech.*, 13(8), 946–953, 1979.
29. Owens, W. D., Sarofim, A. F., and Pershing, D. W., Proc. of Trace Elements Transformations in Coal-fired Power Systems Workshop, Scottsdale, Ariz., Apr. 19–21, 1993.
30. Palazzolo, M. A., Bma, T. G., Kelly, M. E., "Current Status of Dry $SO_2$ Control System," in Proceedings: Eighth EPA/EPRI Symposium on Flue Gas Desulfurization, Volume 2, EPA-600/9-84-017b (NTIS PB84-223049),1984.
31. Parson E. L. Jr., Hemenway L. F., Kragh, O. T., Bma, T. G., Ostop, R. L., "$SO_2$ Removal in Dry FGD," in Proceedings: Symposium on Flue Gas Desulfurization, Volume 2, EPA-600/9-81-019b (NTIS PB81-243164),1981.
32. Perry, R. H., and Green, D., Chemical Engineers Handbook, 6th Ed., McGraw Hill, 1984.
33. Shearer, J. A., Smith, G. W., Myles, K. M., Johnson, I., J *Air Pollut., Control Assoc.*, 1980, 30, 684–688.
34. Thurnau, R. C., and Fournier D. Jr., J *Air Waste Manage. Assoc.*, 42(2), 179–184, 1992.
35. Uberoi, M., and Shadman, F., *Environ. Sci. Technol.*, 25(7), 1991.
36. Uberoi, M., and Shadman, F., *AIChE J.*, 36(2), 1990.
37. Wei, S.-H., Mahuli, S. K., Agnihotri, R., Fan, L.-S., *Ind Eng. Chem. Res.*, 1997, 36, 2141–2148.
38. Wouterlood, H. J., and Bowling, K. M., *Environ. Sci. Technol.*, 13(1), 93–97, 1979
39. Wu, B., Jaanu, K. K., and Shadman, F., *Environ. Sci. Technol.*, 1660–1665

The foregoing references are hereby incorporated herein by reference.

What is claimed is:

1. A system for removing $SO_x$ and trace metals from a gaseous waste stream from coal combustion, said coal combustion generating an untreated gaseous waste stream containing $SO_x$ and trace metals, and the treatment of said gaseous waste stream generating a source of limestone, lime or slaked lime and a flow of clean flue gas containing carbon dioxide, said system comprising:

a source of an untreated gaseous waste stream containing $SO_x$ and trace metals; a sorbent reaction container for receiving said untreated gaseous waste stream and a feed of carbonated sorbent, wherein said sorbent reaction container mixes said untreated gaseous waste stream with said carbonated sorbent such that said carbonated sorbent removes said $SO_x$ and trace metals from said untreated gaseous waste stream thereby forming a reacted sorbent and a treated gas stream;

an apparatus in fluid communication with said sorbent reaction container for separating said reacted sorbent from said treated gas stream, wherein said reacted sorbent comprises limestone, lime or slaked lime;

a carbonation reaction container for receiving said reacted sorbent from said apparatus and a flow of water said carbonation reaction container for receiving a flow of a clean flue gas and admixing said flue gas containing carbon dioxide with said reacted sorbent and said water so as to carbonate said limestone, lime or slaked lime, so as to reactivate said reacted sorbent, thereby producing said carbonated sorbent;

a catalytic reaction container for contacting said treated gas stream with a catalyst adapted to remove $NO_x$ species following treatment in said sorbent reaction container, thereby forming said flow of clean flue gas;

a conduit adapted to conduct said flow of clean flue gas from said catalytic reaction container to said carbonation reaction container; and a dryer for receiving said carbonated sorbent, said dryer adapted to remove water from said carbonated sorbent.

2. A system according to claim 1 wherein said sorbent reaction container comprises a scrubber selected from the group consisting of wet, dry and wet-dry scrubbers.

3. A system according to claim 1 wherein said catalytic reaction container comprises a selective catalytic reduction catalyst.

4. A system according to claim 1 additionally comprising a conduit adapted to conduct said treated gas stream from said sorbent reaction container to said carbonation reaction container.

5. A system according to claim 1 wherein said system additionally comprises a conduit adapted to conduct said source of limestone, lime or slaked lime from said coal-burning facility to said carbonation reaction container.

6. A system according to claim 1 wherein said system additionally comprises a conduit adapted to conduct said untreated gaseous waste stream from said coal-burning facility to said sorbent reaction container.

7. A system according to claim 1 wherein said apparatus comprises at least one particle separator.

8. A system according to claim 1 additionally comprising a heat exchanger adapted to supply heat from said flow of clean flue gas to said dryer.

9. A system according to claim 1 wherein said sorbent reaction container comprises a circulating fluidized bed reactor.

\* \* \* \* \*

UNITED STATES PATENT AND TRADEMARK OFFICE
CERTIFICATE OF CORRECTION

PATENT NO. : 6,569,388 B2  
DATED : May 27, 2003  
INVENTOR(S) : Fan et al.

It is certified that error appears in the above-identified patent and that said Letters Patent is hereby corrected as shown below:

Column 4,  
Line 16, please delete "$CaO_1$" and insert -- $CaO$ , --.

Column 7,  
Line 27, please delete "used as a:sorbent" and insert -- used as a sorbent --  
Line 49, please delete "chalcophilie" and insert -- chalcophilic --

Signed and Sealed this

Twenty-ninth Day of June, 2004

JON W. DUDAS  
*Acting Director of the United States Patent and Trademark Office*